United States Patent Office 3,830,864
Patented Aug. 20, 1974

3,830,864
PROCESS FOR EFFECTING THE MULTIPLE-STAGE CATALYTIC CONTACT OF A REACTANT STREAM
Henry C. Borre, Mount Prospect, Ill., and Wayne N. Root, Statesville, N.C., assignors to Universal Oil Products Company, Des Plaines, Ill.
Original application Jan. 14, 1971, Ser. No. 106,512, now Patent No. 3,751,232. Divided and this application Jan. 8, 1973, Ser. No. 322,031
Int. Cl. C07c 5/18, 15/10
U.S. Cl. 260—669 R     5 Claims

ABSTRACT OF THE DISCLOSURE

A process for effecting the multiple-stage catalytic contact of a reactant stream, particularly directed toward the multi-stage catalytic dehydrogenation of ethylbenzene to styrene. The reaction feed stream is passed alternately in outward and inward radial flow directions through a plurality of adjacent annular catalytic reaction zones, withdrawn from intermediate reaction zones and channeled to mixing zones longitudinally adjacent the next successive annular reaction zones. A heat-exchange medium is introduced into each mixing zone in a manner which effects mixing with the reactant stream and downstream flow thereof to the next succeeding reaction zone.

RELATED APPLICATION

The present application is a Division of our copending application, Ser. No. 106,512, filed Jan. 14, 1971, now U.S. Pat. No. 3,751,232, all the teachings of which copending application are incorporated herein by specific reference thereto.

This application is filed in compliance with a requirement for restriction in co-pending application, Ser. No. 106,512.

APPLICABILITY OF INVENTION

The present invention is directed to an improved means and method for effecting the multiple-stage catalytic contact of a reactant stream, and more particularly to a process and system which utilizes an intermediately introduced heat-exchange stream to provide a mixing effect with the reactant stream between contact stages.

Various types of multiple-stage reactors have found widespread use in the petroleum and chemical processing fields. Similarly, various designs and arrangements for effecting the introduction of a heating or cooling medium into a reaction chamber at successive contact stages have been proposed; however, conventional designs and construction have not made use of a system where the heat-exchange medium is utilized as efficiently as in the present invention. For example, in carrying out an endothermic conversion reaction, such as the dehydrogenation of ethylbenzene, two processing problems have been encountered. One problem resides in the need to replace heat for the endothermic reaction taking place in the conversion zones, while the other problem resides in the requirement of minimal pressure drop, particularly where the operation is being carried out at very critical pressures. On the other hand, hydrocracking and hydrogenation operations, being exothermic in nature, are optimally effected utilizing intermediate additions of a cooler hydrogen stream, or with suitable liquid quench streams between stages, in order to maintain control of the increasing temperature gradient throughout the reaction zone. An improved operation results if there exists a special provision for introducing the cooling medium in a manner which reduces pressure drop.

OBJECTS AND EMBODIMENTS

A principal object of the present invention is to provide a multiple stage reactor unit for effecting a conversion of a fluid stream in the presence of a catalytic contact material which comprises in combination: (a) an elongated pressure-tight chamber; (b) a first elongated perforated tubular-form section coaxially disposed within said chamber to form a tubular manifold means; (c) a second elongated perforated tubular-form section coaxially disposed within said chamber and spaced outwardly from said first tubular-form section to form an annular catalytic contact material section therebetween, said second perforated tubular-form section being spaced within said chamber to form a resulting annular manifold means between the second tubular-form section and the walls of said chamber; (d) at least one imperforate laterally disposed partition means within one of said manifolds of said chamber for dividing said reactor into at least two contact stages; (e) heat exchange fluid inlet means for each partition means used in said chamber and positioned in the other manifold means at about the same level as such partition means for discharging a heat exchange fluid into the fluid stream before reentry of said fluid into the next successive contact stage, whereby there is a mixing of fluid from the upstream contact stage and heat exchange fluid in the other manifold means prior to reentry into such next successive contact stage of catalyst contact material section; (f) inlet means connected to the portion of the manifold means located upstream of the first contact stage of said reactor for introducing the feed stream therein; and, (g) outlet means connected to the portion of the manifold means located downstream of the last contact stage of said reactor for withdrawing the reacted feed stream therefrom.

A corollary objective affords the catalytic contacting of a reactant stream, with such stream passing alternately in outward and inward radial flow directions through a plurality of adjacent annular reaction zones and channeling the partially contacted reactant stream from each intermediate reaction zone to a mixing zone longitudinally adjacent to the next successive reaction zone, and introducing a heat-exchange medium into the mixing zone in a manner effecting both a downstream flow thereof and a mixing with the reactant stream, whereby to reduce the pressure drop in the system.

In a broad aspect, the present invention embodies effecting the multiple-stage contact and conversion of a reactant stream with heat-exchange being effected between contact zones in an improved manner which comprises, passing a feed stream alternately in outward and inward radial flow directions through a plurality of adjacent annular reaction zones; withdrawing the feed stream from each intermediate annular reaction zone and channeling the partially contacted reactant stream to a mixing zone longitudinally adjacent to a next successive annular reaction zone; introducing a heat-exchange medium into each mixing zone in a manner effecting both a downstream flow thereof and a mixing with the reactant stream; introducing the admixture of heat-exchange medium and reactant stream into a next successive annular reaction zone for further conversion therein; and, subsequently withdrawing a resulting contact reactant stream at the downstream end of the last of the plurality of annular reaction zones of contact material.

The operation of an endothermic reaction system, such as ethylbenzene dehydrogenation, will entail the introduction of high temperature super-heated steam into the mixing zones of the process unit between the various zones of the reactor such that there is a resulting downstream directional flow which will educt and "repressure" the partially cooled reactant stream emanating from an adjacent upstream contact zone. The eduction-mixing then provides a reheated reactant stream flow into the inlet portion of the next adjacent downstream annular contact section. By operating in accordance with the practice of this invention, it was found that the temperature decrease through a given reaction zone was minimized with the result that less additional super-heated steam was required, as compared with prior art schemes. Additionally, the use of the radial flow achieves less pressure drop through the overall reaction system than would otherwise be obtained, because of shallower contact zones required, thereby minimizing the pressure at which the reactants are introduced to the first reaction zone, while simultaneously reducing the amount of catalyst necessary to effectuate the reduction. Furthermore, introducing the reactant stream radially through annular reaction zones establishes conditions that approximate an isothermal reaction zone because of the large entrance surface area and shallow depth of the reaction zone. Thus, it is possible to maintain nearly ideal reaction temperatures throughout the zones.

As another embodiment, the present invention may be considered to provide an elongated pressure-tight chamber; a first elongated perforated tubular-form section coaxially disposed within said chamber to form a tubular manifold means; a second elongated perforated tubular-form section coaxially disposed within said chamber and spaced outwardly from said first tubular-form section to form an annular catalytic contact material section therebetween, said second perforated tubular-form section being spaced within said chamber to form a resulting annular manifold means between the second tubular-form section and the walls of said chamber; at least one imperforate laterally disposed partition means within one of said manifolds of said chamber for dividing said reactor into at least two contact stages; heat exchange fluid inlet means for each partition means used in said chamber and positioned in the other manifold means at about the same level as such partition means for discharging a heat-exchange fluid into the fluid stream before re-entry of said fluid into the next successive contact stage, whereby there is a mixing of the fluid from the upstream contact stage and heat-exchange fluid in the other manifold means prior to re-entry into such next successive contact stage of catalyst contact material section; inlet means connected to the portion of the manifold means located upstream of the first contact stage of said reactor for introducing the feed stream therein; and, outlet means connected to the portion of the manifold means located downstream of the last contact stage of said reactor for withdrawing the reacted feed stream therefrom.

Preferably, the heat-exchange fluid inlet means includes a nozzle discharge means directed to the downstream direction and preferably of a Venturi type whereby the downstream flow of the reactant fluid is enhanced to effect minimization of pressure drop for the entire multiple stage unit. The heat-exchange fluid, either a heating or cooling medium, may be introduced through a single inlet conduit when being introduced into the central tubular manifold means or on the other hand a plurality of inlet pipes spaced at equal intervals around the circumference of the annular form manifold means.

Reference to the accompanying drawing will serve to diagrammatically illustrate the present improved method of operation and the reactor construction, while the description in connection therewith will, in addition, point out further advantageous features relative to the design and operation of the multiple-stage reactor.

Figure 1:
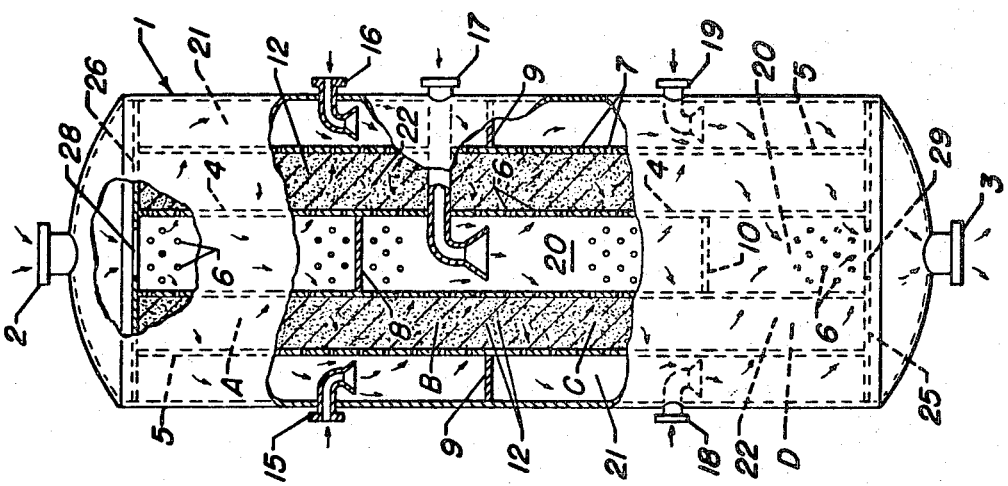
FIG. 1 is an elevational view, in partial section, of a reactor of the present invention having four annular-shaped reactor zones.

Referring now more particularly to FIG. 1 of the drawing, there is shown an elongated pressure-type chamber 1 having a fluid inlet means 2 at the upper end portion thereof and a reaction product outlet means 3 at the lower end portion thereof. Disposed within chamber 1 is a first elongated perforated tubular form section 4 which forms a tubular manifold 20. A second elongated perforated tubular form section 5 is coaxially disposed within chamber 1 and spaced outwardly from the first perforated section 4 to form an annular catalytic contact material section 22 therebetween. The second elongated perforated tubular-form section 5 is spaced within the chamber to form a resulting annular manifold 21 between the walls of chamber 1 and section 5. Of course, perforated sections 4 and 5 have a multiplicity of perforations or openings 6 and 7 to provide for communication between the manifold sections and the catalyst contact material 12 within the catalyst material section 22. Openings 6 and 7 and of course sized to retain the catalyst material 12 within section 22 and also to permit passage of fluid therethrough without creating extreme pressure drops. This particular reactor is divided into four stages by means including imperforate partitions 8 and 10 located within perforate section 4 and annular imperforate partition 9 located in the annular manifold 21. Partitions 8, 9, and 10 serve to divide manifolds but in doing so divide the contact material section 22 into four zones or stages ABCD. In other words, partition 8 is positioned to direct the fluid stream upstream of partition 8 radially outwardly through a portion of the contact material section 22 above partition 8 and indicated by the letter A. Likewise, partition 9 divides the radial form manifold section 21 and in so doing directs the fluid stream upstream of partition 9 radially inward through a portion of the contact material section designated by the letter B. Partition 10 divides the manifold section 20 and in so doing directs the fluid stream upstream of the perforate partition 10 radially outward through the contact material section designated by the letter C. Of course, an end closure plate 25 is provided to direct the flow in the downstream portion of manifold 21 radially through the portion of the contact material section designated by D into the inner tubular-form manifold section 20.

For each partition used there is provided heat-exchange fluid inlet means which is disposed in the other manifold at about the same level as such partitions. In other words heat-exchange inlets 15 and 16 are provided in annular manifold 21 at about the same level as partition 8; heat-exchange inlet 17 is provided in manifold 20 at about the same level as partition 9; and inlets 18 and 19 are provided in manifold 21 at about the same level as partition 10. These inlets discharge a heat-exchange fluid into the fluid stream before re-entry of the fluid stream into a downstream portion of catalyst material section. Preferably, the heat-exchange fluid inlets include nozzle discharge means directed in the downstream direction which are of a Venturi type to thus aid in educting the fluid from the contact material section upstream of each nozzle. More than two nozzles may be provided at each level, especially when located in the annular manifold. When such is the case the preferred deposition is equal intervals for most efficient eduction and mixing.

A top closure plate 26 is provided at the upper end of the reaction chamber to prevent the premature entry of fluid into the outer radial-form manifold section 20 as well as into the catalyst retaining section 22. Openings 28 and 29 are provided in plates 26 and 25 to establish communication between the inlets 2 and the upstream portion of manifold 20 and between outlet 3 and the downstream portion of manifold 20.

The contact material section 22 has disposed therein the catalyst material 12 or other suitable contact material to assit in carrying out the particular conversion or treating operation. It is noted that the catalyst retaining section 22 is continuous and has no partitions therein. This facilitates the filling and refilling as well as emptying of the catalyst particles when desired. In previous multistage contact chambers, catalyst material would have to be taken from each individual reaction zone whereas in the present invention only one empyting procedure is required to evacuate and fill all four zones.

By way of explanation, in connection with a high-temperature endothermic reaction, such as the dehydrogenation of ethylbenzene to produce styrene, superheated steam may be utilized as a heating medium for the conversion. The feed stream of ethylbenzene, including some portion of superheated steam is passed alternatively in outward and inward radial flow directions through zones A through D. The initial temperature of the feed stream entering inlet 2 will be of the order of approximately 1100° F. The partially contacted feed stream is withdrawn from each intermediate zone A, B, and C and channeled to the mixing zones of the manifolds 20 and 21 longitudinally adjacent the next successive annular reaction zones B, C, and D, respectively. The superheated steam is introduced by way of the heat-exchange inlet means 15, 16, 17, 18, and 19 at the temperature of the order of approximately about 1400° F. and in a downstream direction through the unit so as to enhance the flow of the hydrocarbon vapors flowing from the catalyst material section 22. At the same time there is effected a reheating of the vapors to a desired temperature which may be of the order of about 1100° F. as they leave the longitudinal mixing sections adjacent the downstream portions of the retaining section. At successive downstream stages, the superheated steam may be at higher temperatures so as to gradually increase the temperature of the reactant stream as it progresses from stage to stage through the entire multiple stage reactor unit. Generally, this dehydrogenation reaction will be carried out at a low pressure of the order of about 10 p.s.i.g., or preferably slightly lower. Thus, it may be seen that pressure drop through successive zones of the contact material will be a problem unless means is taken to effect eduction such as provided by the present invention.

As hereinbefore noted, it is not intended to limit the present improved type of operation or improved apparatus arrangement to any one system inasmuch as there are various types of conversions or treating steps which may be carried out in accordance with the present improved apparatus. In the case of exothermic operations, such as hydrogenation, a relatively cool hydrogen steam may be introduced through each of the inlet nozzles 15, 16, 17, 18 and 19 so that a relatively cool educting stream is provided to provide the dual function of mixing with the reactant stream flow in the successive mixing zones adjacent the contact material section, as well as assist in educting reactant stream flow from one zone to the next and thus effect a decrease in the overall pressure drop through the multiple stage unit.

Figure 2:
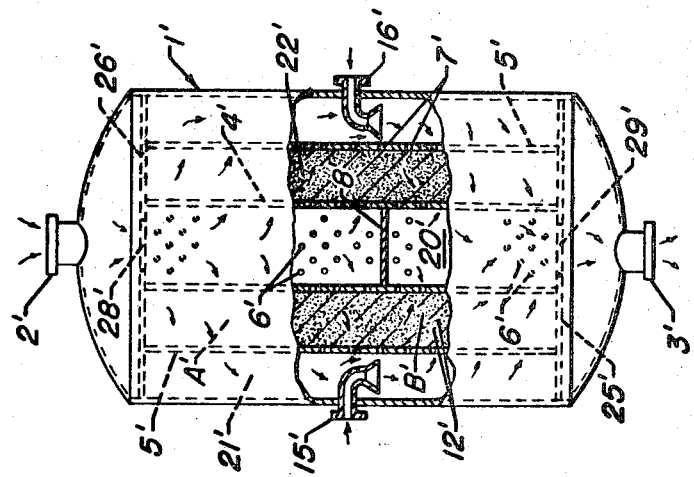
FIG. 2 is an elevational view, shown partially in section, of a reactor of this present invention having two annular reactor zones.

Various modifications may of course be made with respect to the structural features shown in the present embodiment without departing from the scope of the present invention. For instance, in FIG. 2 there is shown a reactor having two annular shaped reaction zones formed in a similar manner as the embodiment of FIG. 1. The difference in the embodiment of FIG. 2 is basically of size and number of partitions and inlet heat-exchange means used. The numerals used to designate various parts of the reactor of FIG. 2 are primed to show the corresponding features of FIG. 1. The smaller reactor may be utilized quite effectively either singularly or in series of two or more like reactors.

From the foregoing description it is readily seen that the present invention provides for the multiple-stage contacting of a reactant stream, with such stream passing alternatively in outward and inward radial flow directions through a plurality of adjacent annular reaction zones, with a heat-exchange medium being introduced between intermediate zones in a manner effecting a downstream flow and an eduction mixing with the reactant stream. The use of the radial flow and "repressuring" concept achieves less pressure drop through the overall reaction system than would otherwise be possible. In addition, less heat-exchange medium is required than with prior art schemes.

We claim as our invention:

1. A process for effecting the multiple-stage contact and conversion of a reaction feed stream, with direct heat-exchange intermediate the contacting stages, which process comprises the steps of:
   (a) introducing said feed stream, in alternating inward and outward radial flow directions, through a plurality of adjacent annular reaction zones;
   (b) withdrawing said reaction feed stream from the first and each intermediate annular reaction zone, and introducing the feed stream into a mixing zone longitudinally adjacent to the next successive annular reaction zone;
   (c) introducing a heat-exchange medium into said mixing zone in downstream flow and effecting mixing thereof with said feed stream;
   (d) introducing the resulting mixture of said heat-exchange medium and feed stream into a next successive annular reaction zone; and
   (e) withdrawing the resulting converted feed stream from the last annular reaction zone in said plurality.

2. The process of Claim 1 further characterized in that the number of reaction zones in said plurality is from two to about five.

3. The process of Claim 1 further characterized in that said heat-exchange medium effects an increase in the temperature of said reaction feed stream.

4. The process of Claim 1 further characterized in that said heat-exchange medium effect a decrease in the temperature of said reaction feed stream.

5. The process of Claim 1 further characterized in that said heat-exchange medium is steam and said reaction feed stream is ethylbenzene.

References Cited

UNITED STATES PATENTS

| | | | |
|---|---|---|---|
| 3,402,212 | 9/1968 | Gantt | 260—669 R |
| 3,498,756 | 3/1970 | Carson | 260—669 R |
| 3,118,006 | 1/1964 | Lovett et al. | 260—669 R |
| 3,326,996 | 6/1967 | Henry et al. | 260—669 R |
| 3,499,051 | 3/1970 | Tokumitsu et al. | 260—669 R |

CURTIS R. DAVIS, Primary Examiner